April 3, 1951          V. A. POTHOLM          2,547,718
COMBINED DUSTER AND BLOWER
Filed March 23, 1946
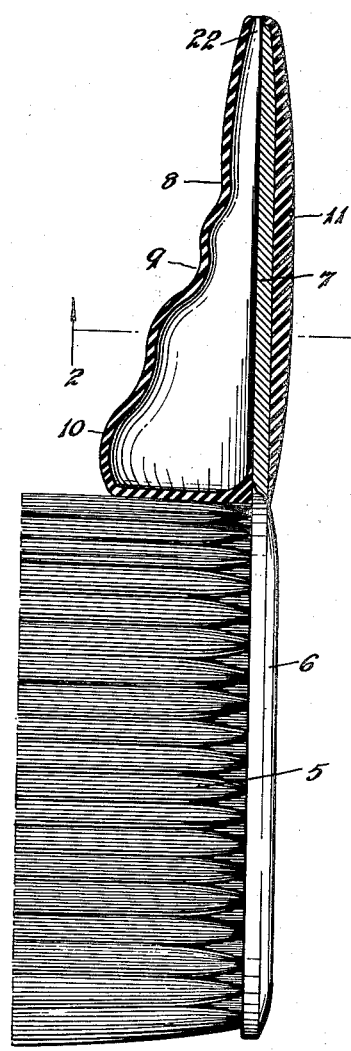
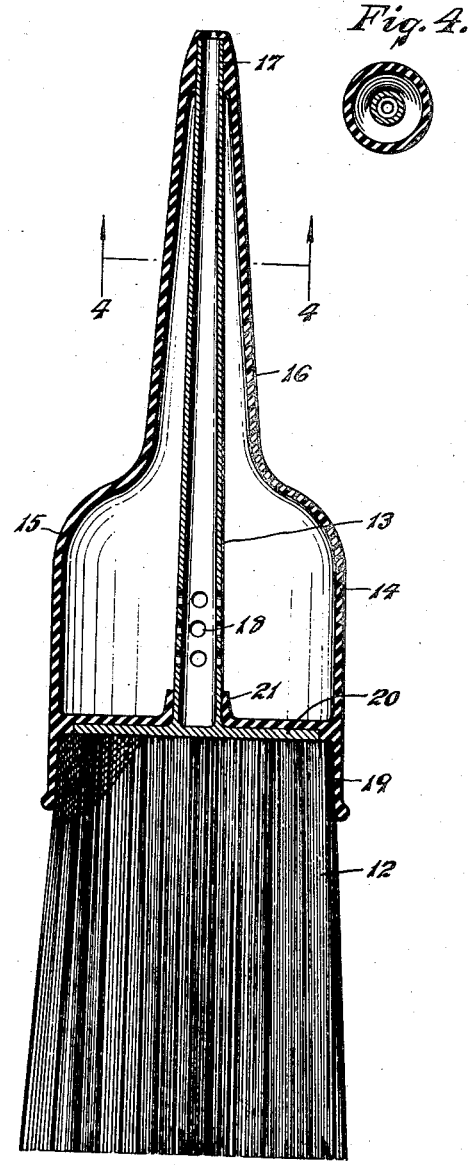
Inventor
VALDEMAR A. POTHOLM.
By *Louis V. Lucia.*
Attorney Patented Apr. 3, 1951

2,547,718

UNITED STATES PATENT OFFICE 2,547,718

COMBINED DUSTER AND BLOWER

Valdemar A. Potholm, Hartford, Conn.

Application March 23, 1946, Serial No. 656,670

2 Claims. (Cl. 15—105)

This invention relates to dusters and more particularly to dusters such as covered in my Patent No. 2,391,070, issued December 18, 1945.

An object of this invention is to provide a brush having an improved handle which may be used as a blower for blowing dust or dirt away from inaccessible places.

A further object of this invention is to provide such a handle which is sufficiently firm to prevent flexing when grasped by the hand, so that the brush may be manipulated under proper control for the dusting or cleaning operation.

Further objects and advantages of my invention will be more clearly understood from the following description and from the accompanying drawings, in which—

Fig. 1 is a side view, partially in central vertical section, of a duster embodying my invention.

Fig. 2 is a view in section on the line 2—2 of Fig. 1.

Fig. 3 is a view in central vertical section of a modified form of duster embodying my invention.

Fig. 4 is a sectional view on the line 4—4 of Fig. 3.

As shown in the drawings, the numeral 5 denotes a duster in the form of a brush having a back 6 with a handle 7 extending therefrom.

My invention provides a bulb 8, or the like, which is disposed over the handle 7 and preferably molded thereon, or it may be secured thereto by cementing or in any other suitable manner.

This bulb is preferably constructed to provide a contour 9 conforming to the fingers of the handle for convenient gripping thereof and has an enlarged portion 10, at one side of the handle, and a substantially flat portion 11 which is secured to the handle 7 and conforms generally with the contour thereof.

The said bulb is provided with a nozzle 22 at the top of the handle for the emission of air therefrom in the operation of the bulb.

In operation, the handle 7 may be used by grasping the entire bulb 8, which conforms substantially to the handle, and the said handle, projecting within the bulb, will provide rigidity for manipulation of the duster 5.

When it is desired to blow air into inaccessible places, the bulb 8 is grasped by the fingers and compressed; thus forcing the air out through the nozzle 22.

In the modified form shown in Fig. 3, my improved duster and blower comprises a brush portion 12 which includes a bunch of bristles that is secured to a head 20 and within a recess 19 in a bulb 14 by any suitable means, such as by cementing, molding or rubber setting. The said head 20 is provided with a tubular handle 13 which is secured thereto and projects upwardly therefrom.

The bulb 14 provides a blower for use in combination with the duster. This bulb is constructed to provide an enlarged portion 15 and a nozzle portion 16 which ends in a reduced opening 17 within which closely fits the end of the tubular handle 13. The said compressible member is provided with a bottom wall having a central opening with a surrounding inwardly projecting flange 21 that closely receives the handle 13. A surrounding flange depends downwardly below said bottom wall to provide the recess 19 for receiving the bristles and the head 20 of the brush portion 12 as hereinbefore described.

The tubular handle 13 is tapered so that it will provide an air-tight fit within the opening in the bottom wall of the bulb and within the said opening 17 in the nozzle of said bulb which, as shown, extends over the handle 13.

The said handle 13 is provided with openings 18 communicating the interior of said tube with the interior of the bulb 14 so that, upon compressing the enlarged bulb portion 15, air will be forced from the interior of the bulb, through said openings, into the interior of the handle 13 and expelled from the tip of the nozzle 16.

I claim:

1. A combined duster and blower device of the character described comprising a brush portion including a head having a tubular handle extending therefrom, and a compressible member fitted over said handle to provide a blower for said device; the said compressible member including a bulb portion and a nozzle portion fitting over the end of said handle, a bottom wall with a central opening fitting over the lower portion of the handle, and a surrounding flange extending below said bottom wall and providing a recess to receive the said head.

2. A combined duster and blower device of the character described comprising a brush portion having a head, a rigid tubular handle extending upwardly from said head, and a compressible member mounted over said handle and head, the said compressible member comprising a bulb portion having a nozzle extending therefrom and fitting over the end of the said tubular handle, a bottom wall having a central opening fitting over the base portion of said handle, and a recess in the bottom of said member receiving the head of said brush portion; the said tubular handle having openings communicating with the interior of the bulb portion to provide for the passage of air from said interior into said handle and out of said nozzle.

VALDEMAR A. POTHOLM.

REFERENCES CITED

The following references are of record in the file of this patent:

UNITED STATES PATENTS

| Number | Name | Date |
|---|---|---|
| 814,235 | Rosenstein | Mar. 6, 1906 |
| 1,065,256 | La Mar | June 17, 1913 |
| 1,757,650 | Arico | May 6, 1930 |
| 2,237,984 | Frame et al. | Apr. 8, 1941 |
| 2,268,740 | Cory | Jan. 6, 1942 |
| 2,315,996 | Workman | Apr. 6, 1943 |
| 2,391,070 | Potholm | Dec. 18, 1945 |

FOREIGN PATENTS

| Number | Country | Date |
|---|---|---|
| 188,836 | Germany | Nov. 9, 1906 |